(12) United States Patent
Holt

(10) Patent No.: US 11,993,364 B2
(45) Date of Patent: May 28, 2024

(54) LANDING GEAR JOINT LUBRICATION

(71) Applicant: AIRBUS OPERATIONS LIMITED, Bristol (GB)

(72) Inventor: Richard Holt, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 294 days.

(21) Appl. No.: 17/184,863

(22) Filed: Feb. 25, 2021

(65) Prior Publication Data

US 2021/0261241 A1  Aug. 26, 2021

(30) Foreign Application Priority Data

Feb. 26, 2020  (GB) ........................... 2002726

(51) Int. Cl.
*B64C 25/00* (2006.01)
*B64D 45/00* (2006.01)

(52) U.S. Cl.
CPC ........ *B64C 25/001* (2013.01); *B64D 45/0005* (2013.01)

(58) Field of Classification Search
CPC ........................... B64C 25/001; B64D 45/0005
See application file for complete search history.

(56) References Cited

U.S. PATENT DOCUMENTS

| | | | | |
|---|---|---|---|---|
| 2,440,410 A * | 4/1948 | Leonard | ............. | F16N 25/02 |
| | | | | 222/137 |
| 5,427,329 A * | 6/1995 | Renzelmann | ............. | B64C 3/56 |
| | | | | 292/144 |
| 6,409,121 B1 * | 6/2002 | Lindahl | ............. | B64C 25/02 |
| | | | | 244/100 R |
| 2003/0085321 A1 * | 5/2003 | Reniau | ............. | F16N 7/36 |
| | | | | 244/100 R |
| 2008/0217107 A1 | 9/2008 | Schmidt | | |
| 2010/0239361 A1 * | 9/2010 | Schmidt | ............. | B64C 25/18 |
| | | | | 403/37 |

OTHER PUBLICATIONS

Partial European Search Report for European Application No. 21158901.5, 12 pages, dated Jun. 28, 2021.
Combined Search and Examination Report for GB2002726.4 dated Aug. 25, 2020, 6 pages.

* cited by examiner

*Primary Examiner* — Justin M Benedik
(74) *Attorney, Agent, or Firm* — Nixon & Vanderhye P.C.

(57) ABSTRACT

A pin assembly for insertion into a pin joint of an aircraft landing gear is disclosed. The pin assembly includes a reservoir for storing a lubricating agent and a piston mounted for reciprocal movement within the reservoir, the piston dividing the reservoir into a first chamber and a second chamber. A bi-directional flow path between the first and second chambers via the surface to be lubricated is provided by means of a first bi-directional flow path between the first chamber and the exterior of the pin assembly and a second bi-directional flow path between the second chamber and the exterior of the pin assembly. A pin assembly including an indicator system, and a pin insert in the form of a replaceable cartridge is also disclosed along with associated methods.

15 Claims, 8 Drawing Sheets

LANDING GEAR JOINT LUBRICATION

CROSS REFERENCE TO RELATED APPLICATION

This application claims priority to United Kingdom Patent Application No. GB 2002726.4, filed Feb. 26, 2020, the entire contents of which is hereby incorporated by reference.

BACKGROUND OF THE INVENTION

The present invention concerns lubrication, for example greasing, of pin joints on aircraft landing gear. More particularly, but not exclusively, this invention concerns methods and apparatus for self-lubricating pin joints. The invention concerns a pin assembly for use in a pin joint of an aircraft landing gear, an aircraft landing gear having a pin joint comprising such a pin assembly, a method of lubricating a pin joint of an aircraft landing gear using such a pin assembly, and a method of lubricating a pin joint of an aircraft landing gear using a pin insert comprising elements of such a pin assembly.

Aircraft landing gear often include one or more dynamic pin joints (hereafter pin joints) to provide pivotal movement of one component relative to the other, for example during extension and retraction of the landing gear. Typically, such joints comprise a pin and structure on one or more of the components that defines a hole in which the pin is received such that at least one of the components can rotate relative to the pin. A bushing may be pressed into the hole to provide an interface between the pin and the surrounding structure of the components. In order to provide smooth movement of the joint and/or to reduce wear from frictional contact between the pin and the other components of the joint a lubricant, for example grease, is applied to contacting surfaces of the pin joint. In use, lubricant is lost from the joint and/or the lubricant degrades through use of with time, so the lubricant within a joint must be periodically replenished. Failure to ensure proper lubrication of the joint may result in a deterioration of the performance of the joint and/or reduce the life of the joint.

In a prior art method of greasing, a hollow pin is used in the pin joint. A grease spool is inserted into the pin. The grease spool comprises one or more grease nipples connected to one or more grease channels in the body of the spool such that grease injected into the nipples flows along the channels and is distributed to various points on the surface of the spool. The grease can then flow through apertures in the pin to reach the surface to be lubricated, for example the exterior surface of the pin that contacts the bushing (if present) or surface of the surrounding structure of the components. Grease is typically pumped into the grease spool by a maintenance operative using a grease gun that attached to the grease nipples. When greasing a pin joint in this way it is difficult to ensure that adequate grease has been delivered into the joint; there may be blockages in the channels that prevent grease reaching certain parts of the joint and/or that give the impression that the pin joint is fully supplied with grease when it is not. Operatives may also overlook one or more grease nipples during a particular maintenance session due to the large number of such nipples found on the landing gear as a whole. Such manual greasing of joints is time consuming and expensive. Accordingly, it would be advantageous to provide a method and apparatus for lubricating pin joints that improved the quality and/or reliability of lubrication and/or reduced the costs associated with the lubrication of such joints.

US 2008/0217107 discloses a self-lubricating pin assembly for use in a pin joint. The pin assembly comprises a hollow pin and a pin insert received within the pin. The pin insert includes a chamber configured to receive and store a quantity of grease. In one embodiment, a piston within the chamber is mechanically coupled to the rest of the landing gear such that extension and retraction of the landing gear causes the piston to move along the chamber thereby forcing grease out of apertures formed in the chamber walls. Once the piston has reached the end of the chamber the chamber is manually refilled and the piston manually reset to its start position. It would be advantageous to provide a device that improved the quality and/or reliability of lubrication and/or further reduced the need for manual intervention.

US 2003/0085321 discloses a ball joint bearing block lubrication device. The device comprises a reservoir integrated inside the pin of a ball joint bearing block. The device is arranged such that successive extension and retraction movements of the landing gear have the effect of alternatively injecting lubricant between the ball and the cage of the ball joint, and between the hinge pin and the ball. The device is mechanically complex comprising a number of valves, reservoirs and compensation chambers. It would be advantageous to provide a device that improved the quality and/or reliability of lubrication in a pin joint and/or a mechanically simpler device for use in a pin joint.

The present invention seeks to mitigate one or more of the above-mentioned problems. Alternatively or additionally, the present invention seeks to provide an improved method and apparatus for the lubrication of pin joints.

SUMMARY OF THE INVENTION

In a first aspect, the present invention provides a pin assembly for use in a pin joint of an aircraft landing gear. The pin assembly may comprise structure defining a reservoir for storing a lubricating agent. Said structure may be configured for insertion into the pin joint. The pin assembly may comprise a piston mounted for reciprocal movement within the reservoir. It may be that the piston divides the reservoir into a first chamber and a second chamber. The pin assembly may comprise a first bi-directional flow path between the first chamber and the exterior of the pin assembly. The pin assembly may comprise a second bi-directional flow path between the second chamber and the exterior of the pin assembly.

When the pin assembly is inserted into a pin joint, the provision of bi-directional flow paths into both the first and second chambers allows for lubricating agent to flow back and forth between the first and second chambers along the same flow path as the piston moves back and forth in the reservoir. This recirculation of lubricating agent may increase the period between maintenance intervals when compared to devices which simply eject lubricating agent from the reservoir. Additionally or alternatively, the reversing flow direction may improve the distribution of grease across the joint and/or reduce the likelihood of the blockages, for example from lubricating agent hardening within the joint. The provision of such bi-directional flow paths may also lead to a device that is less mechanically complex than other prior art lubrication devices that provide recirculation of lubricant, thereby increasing reliability of the device and/or reducing weight and/or cost of the device.

It will be appreciated that when the pin assembly is inserted into the pin joint the first and second bi-directional flow paths may form part of the same bi-directional flow path. A bi-directional flow path may be defined as a flow path that permits flow of lubrication agent in a first direction and a second direction opposite to the first direction. It may be that each of the first and/or second bi-directional flow paths allows flow in both directions between a chamber of the pin assembly and the exterior of the pin assembly, for example an outermost surface of the pin assembly. Each flow path may pass through one or more openings, apertures and/or passageways formed in the pin assembly and/or the components thereof. It may be that there are no valves or moving components on the first and/or second bi-directional flow paths. It may be that the first and/or second bi-directional flow paths are continuously open.

The reciprocal movement of the piston within the reservoir may comprise repeated back and forth movement of the piston along the length, for example the majority of the length, of the reservoir. Thus, the reciprocal movement may comprise movement in a first direction along the length of the reservoir followed by movement in a second, opposite, direction along the length of the reservoir.

The reservoir may be wholly defined by the structure defining the reservoir. The reservoir may be defined at least in part by the structure defining the reservoir.

The pin assembly may comprise a pin, for example a hollow pin, configured to be received in the pin joint. The pin may be in the form of a substantially cylindrical body, for example a hollow cylinder open at both ends.

In some embodiments the hollow pin defines the reservoir in whole or in part. The structure defining the reservoir may comprise the hollow pin. The structure defining the reservoir may comprise one or more endcaps, each endcap sealing off an end of the hollow pin. Thus, the reservoir may be defined, for example wholly defined, by the hollow pin and one or more, for example two, endcaps. Each endcap may comprise one or more seals.

Using the hollow pin to define the reservoir may reduce the number of additional components required to provide lubrication to the joint thereby reducing weight and/or cost of the pin assembly.

In some embodiments the reservoir may be defined by a main body that is received within the hollow pin. The pin assembly may comprise a main body configured to be received within the pin joint, for example within a hollow pin received within the pin joint. The main body may comprise the structure defining the reservoir. The main body may have a length. The reservoir may extend along a portion of, for example the majority of, the length of the main body. The main body may be a hollow body. The main body may be in the form of a substantially cylindrical body having closed ends. It may be that the hollow pin does not define the reservoir. The structure defining the reservoir, for example the main body, may be made of a polymer material, for example nylon.

Providing a main body may separate from the pin may allow for easier replacement of the store of lubricating agent within the reservoir. Additionally or alternatively, use of such a main body may allow for a standalone lubrication device, separate from the structural components of the joint.

The main body may be a cartridge, for example a refillable and/or replaceable cartridge. Providing a pin assembly comprising a cartridge may facilitate easier replacement of the lubricating agent as the lubricating agent may be replaced by refilling and/or replacing the cartridge. Thus, the pin assembly may comprise a cartridge configured to be received in the pin joint. The cartridge may comprise the structure defining the reservoir.

The pin assembly may comprise a first aperture or opening in the structure defining the reservoir. The first aperture may define, at least in part, the first bi-directional flow path. The pin assembly may comprise a second aperture or opening in the structure defining the reservoir. The second aperture may define, at least in part, the second bi-directional flow path. The first and second apertures may be formed in the structure defining the reservoir, for example the hollow pin or the main body. In this way a first or second bi-directional flow path may be provided simply by having one or more openings in the structure defining the reservoir. When the pin assembly is received in the pin joint, a bi-directional flow path between the first and second chambers may comprise (for example, in order) the first aperture, the surface to be lubricated, and the second aperture. The first and second apertures may be spaced apart along the length of the reservoir, such that the first and second apertures are on different sides of the piston.

In the case that the pin assembly comprises a main body that defines the reservoir, the hollow pin may comprise first and second pin-apertures. The first and second pin-apertures corresponding to the first and second apertures respectively. Thus, the first bi-directional flow path may be defined at least in part by the first aperture and the first pin-aperture. The second bi-directional flow path may be defined at least in part by the second aperture and the second pin-aperture. When the pin assembly is received in the pin joint, a bi-directional flow path between the first and second chambers may comprise (for example, in order) the first aperture, the first pin aperture, the surface to be lubricated, the second pin aperture and the second aperture.

It will be appreciated that the pin assembly may comprise a plurality of bi-directional flow paths connecting the first and/or second chambers to the exterior of the pin assembly. The pin assembly may comprise a shaft. The piston may be mounted for movement along the shaft, for example for reciprocal movement along the shaft. The shaft may be concentrically mounted within the reservoir.

The pin assembly may be configured such that rotation of the shaft, for example in a first rotational direction, causes reciprocal movement of the piston. That is to say, the shaft may be configured such that movement of the piston in the first and second directions is provided by rotation of the shaft in a single, for example a first, rotational direction. The shaft may comprise a self-reversing thread such that rotation of the shaft in a first rotational direction causes movement of the piston in either the first or second direction depending on the location of the piston on the thread. The pin assembly may be configured such that the piston cannot rotate relative to the structure defining the reservoir and/or the pin. For example, the piston may shaped to engage with a feature on the interior of the structure defining the reservoir so as to prevent rotation of the piston. For example, one of the piston and structure defining the reservoir may comprise a protrusion and the other of the piston and structure defining the reservoir may comprise a recess configured to receive the protrusion such that rotation of the piston is prevented. The recess or protrusion formed in the structure defining the reservoir may extend along a portion of the length, for example the majority of the length, of the reservoir. A self-reversing thread may be a mechanically simple yet reliable way of providing the reciprocating motion of the piston.

The pin assembly may comprise a store of lubricating agent, for example grease.

It may be that lubricating agent is stored on both sides of the piston in the reservoir. The lubricating agent may be stored in both the first chamber and the second chamber. It may be that majority of the volume, for example substantially the entirety of the volume of the reservoir is filled with lubricating agent. It may be that majority of the volume, for example substantially the entirety of the volume of each of the first and second chambers is filled with lubricating agent.

The piston may be mounted for reciprocal movement between first and second endpoints, the first and second endpoints being spaced apart along the length of the reservoir. The first and/or second apertures may be located outboard of the first and second endpoints along the length of the reservoir.

The pin assembly may comprise a drive train configured to move the piston. The drive train may be configured such that relative movement between the pin assembly and the rest of the landing gear during one of extension or retraction of the landing gear causes movement of the piston. The drive train may comprise the shaft. The drive train may comprise a drive arm for connection to a component of the landing gear such that rotation of the pin joint causes movement of the drive arm relative to the rest of the pin assembly. The drive train may be configured such that movement of the drive arm causes movement of the piston. The drive train may be configured such that movement of the drive arm causes rotation of the shaft, for example in the first rotational direction. The drive train may comprise a ratchet mechanism such that movement of the drive arm only causes rotation of the shaft in the first rotational direction. The drive train, for example the ratchet mechanism, may be configured such that movement of the drive arm in a first drive direction is transformed into movement of the shaft (e.g. in the first rotational direction) and/or piston but movement of the drive arm in a second, opposite, drive direction is not transformed into movement of the shaft and/or piston. The drive arm may be connected to the landing gear such that the drive arm moves in the first drive direction during one of extension and retraction of the landing gear. The drive arm may be connected to the landing gear such that the drive arms moves in the second drive direction during the other one of extension and retraction of the landing gear.

The drive train may be configured such that one of extension and retraction of the landing gear causes a stepwise movement of the piston along the length of the reservoir, the reciprocal movement of the piston comprising a plurality of such stepwise movements. Each stepwise movement may be a movement of the piston in the first or second direction by a distance less than the distance between the first and second endpoints.

The pin assembly may comprise an indicator system configured to provide an indication, for example a visual indication, that the piston has completed a predetermined number of cycles of movement. The indicator assembly is described further below.

The pin assembly may comprise a pin insert. The pin insert may be configured to be received in the hollow pin. The pin insert may comprise any of the elements described above, other than the hollow pin. For example, the pin insert may comprise the main body (if present), the structure defining the reservoir, the reservoir, the piston, one or more elements of the drive train, the lubricating agent, and/or one or more elements of the indicator system.

The piston may contact the surface of the structure defining the reservoir such that there is substantially no flow of lubricating agent between the first and second chambers around the piston. The pin assembly may comprise one or more seals mounted on the piston and/or the structure defining the reservoir such that flow of lubricating agent around the piston is prevented.

The structure defining the reservoir may comprise one or more grease nipples via which lubricating agent can be provided, for example injected into the reservoir. Alternatively, it may be that the structure defining the reservoir does not include a grease nipple.

In another aspect of the invention, there is provided a pin assembly for use in a pin joint of an aircraft landing gear. The pin assembly may comprise structure defining a reservoir for storing a lubricating agent, said structure being configured for insertion into the pin joint. The pin assembly may comprise a piston mounted for reciprocal movement within the reservoir, said reciprocal movement comprising a plurality of cycles, each cycle comprising a movement of the piston in a first direction followed by a movement of the piston in a second, opposite, direction. The pin assembly may comprise a drive train configured such that either extension or retraction of the landing gear causes a stepwise movement of the piston along the length of the reservoir, said reciprocal movement comprising a plurality of such stepwise movements. Thus, for a first plurality of extensions or retractions of the landing gear the piston moves in a first direction, for example away from the first end point and towards the second end point and for a second plurality of extensions or retraction of the landing gear the piston moves in a second direction, for example away from the second end point and towards the first end point, with that cycle repeating a number of times. Pin assemblies in accordance with this aspect of the invention therefore allow recirculation of the lubrication agent with changing flow direction along a flow path over a number of cycles of extension and retraction of the landing gear. This recirculation and changing flow direction may extend the useful life of the lubricating agent (thereby reducing the frequency at which refilling must be carried out) and/or improve the reliability of joint lubrication by reducing the risk of a blockage along the flow path of the lubricating agent.

In another aspect of the invention, there is provided a pin assembly for use in a pin joint of an aircraft landing gear. The pin assembly may comprise structure defining a reservoir for storing a lubricating agent, said structure being configured for insertion into the pin joint. The pin assembly may comprise a piston mounted for reciprocal movement within the reservoir, said reciprocal movement comprising a plurality of cycles, each cycle comprising a movement of the piston in a first direction followed by a movement of the piston in a second, opposite, direction. As described above, each cycle may comprise a movement from the first endpoint to the second end point and from the second endpoint to the first endpoint. Each movement between the first and second endpoint may comprise a plurality of stepwise movements. The pin assembly may comprise an indicator system configured to provide an indication, for example a visual indication, that the piston has completed a predetermined number of cycles. Providing an pin insert configured to provide an indication when a predetermined number of back-and-forth motions of the piston has been completed may allow for improved lubrication of pin joints by encouraging timely replacement of lubricant and/or simplifying maintenance operations. The pin assembly of the present aspect may have any of the features of the pin assembly described above.

The indicator system may comprise an indicator member. The indicator member may comprise a region having an distinctive appearance, for example a brightly coloured region, for example a red region, hereafter referred to as an indicator region. The indicator system may be configured to move the indicator member from an 'in-service' position in which at least a portion, for example the whole of, the indicator region is hidden from view to a 'maintenance due' position in which a portion of the indicator region that is hidden in the 'in-service' position is visible. The indicator system may comprise a resilient member, for example a spring. The pin assembly and indicator system may be configured such the resilient member moves the indicator member to the 'maintenance due' position after a predetermined number of cycles of movement of the piston. The resilient member may bias the indicator member to the 'maintenance due' position. The indicator system may comprise a blocking member that prevents movement of the indicator member to the 'maintenance due' position before the predetermined number of cycles of movement of the piston have been achieved. The blocking member may be mounted for movement relative to the indicator member from an 'in-service' position in which the blocking member prevents movement of the indicator member to the 'maintenance due' position to a 'maintenance due' position in which the indicator member can move to its 'maintenance due' position. The blocking member may be connected to the drive train and/or piston such that the blocking member moves from the 'in-service' position to the 'maintenance due' position after a predetermined number of cycles of movement of the piston.

The mechanism described above may provide a mechanically simple but effective way of providing an indication.

The indicator system may be configured to move to the 'maintenance due' position in the event the draft train fails. Providing such an indicator system may reduce the risk of a prolonged interruption in the supply of lubricating agent to the joint.

In another aspect of the invention there may be provided a landing gear pin joint comprising a pin assembly and/or pin insert as described in any other aspect. A pin joint may defined as a joint comprising a pin configured to provide movement in a single degree of freedom, namely rotation about the longitudinal axis of the pin.

The pin joint may comprise a surface to be lubricated. The pin joint may be configured such that the first bi-directional flow path is connected to the second bi-directional flow path via the surface to be lubricated. Thus, the pin joint may comprise a bi-directional flow path for lubricating agent between the first and second chambers via the surface to be lubricated. In this way lubricating agent may flow back and forth between the first and second chambers via the surface to be lubricated.

The pin joint may comprise a bushing received within the joint. The pin assembly and/or pin insert may be received within the bushing, for example the hollow pin and/or pin insert may be concentrically mounted within the bushing. The pin assembly may be mounted within the bushing for rotation relative to the bushing. Thus, the interface between the bushing and the pin insert may comprise one or more surface(s) to be lubricated. The bushing may comprise an inner surface. The pin assembly, for example the hollow pin, may comprise an outer surface. When the pin assembly is received within the pin joint the outer surface of the pin assembly may be adjacent the inner surface of the bushing. The surface to be lubricated may be one or more of the inner surface of the bushing or the outer surface of the pin assembly.

The surface to be lubricated, for example the inner surface of the bushing or the outer surface of the pin assembly may comprise one or more grooves or channels configured to distribute lubricating agent across the surface. The groove or channels may extend circumferentially and/or longitudinally around the joint, for example across the surface(s) to be lubricated. Such grooves or channels may form part of the bi-directional flow path between the first and second chambers. Thus, the flow path may comprise (for example in order) the first aperture, the first pin aperture (if present), one or more grooves or channels, the surface to be lubricated, another one or more grooves or channels, the second pin aperture (if present) and the second aperture.

In a further aspect of the invention there is provided an aircraft landing gear comprising an aircraft landing gear pin joint as described above. The landing gear may comprise a first component pivotally connect to a second component via one or more pin joints as described above. The first and/or second components may comprise one or more holes into which the pin assembly and/or bushing (if present) is received. The landing gear may be a retractable landing gear. The drive arm (if present) may be connected to one of the first or second components.

In a further aspect of the invention there is provided an aircraft comprising an aircraft landing gear and/or pin joint as described above. The aircraft may be a commercial passenger aircraft, for example an aircraft configured to transport at least 50, for example at least 100 passengers (or a commercial transport aircraft of similar size).

In a further aspect of the invention there is provided a pin assembly for use as the pin assembly of any other aspect described above.

In a further aspect of the invention there is provided a method of lubricating a pin joint of an aircraft landing gear using a pin assembly comprising a reservoir, optionally a reservoir located, for example formed or received, within the joint, containing a lubricating agent and a piston dividing the reservoir into first and second chambers. The method may comprise the piston reciprocating within the reservoir, said reciprocation comprising movement in a first direction and movement in a second, opposite, direction. It may be that movement of the piston in the first direction causes lubricating agent to flow in a first flow direction along a bi-directional flow path connecting the first chamber to the second chamber via a surface to be lubricated; and/or movement of the piston in the second direction causes lubricating agent to flow in a second, opposite, flow direction along the bi-directional flow path.

By providing flow of lubricant in two directions along the same flow path the risk of blockages may be reduced and/or the distribution of lubricant within the joint may be improved. Additionally or alternatively, the period between maintenance intervals may be increased as lubricant recirculates through the joint and pin assembly.

The method may comprise the piston moving in a first direction along the reservoir for a first plurality of stepwise movements thereby forcing a plurality of portions of lubricating agent out of a first chamber to create a flow of lubricating agent in a first flow direction along a the bi-directional flow path towards the second chamber. The method may comprise the piston moving in a second, opposite, direction along the reservoir for a second plurality of stepwise movements thereby forcing a plurality of portions of lubricating agent out of the second aperture to create a flow of lubricating agent along the same flow path in a second flow direction, opposite to the first flow direction. Each stepwise movement may comprise a movement of the piston by a distance less than the distance between the first and second endpoints, for example less than 10 percent, for example less than 5 percent, for example around 1 percent of the distance between the first and second endpoints.

The method may comprise repeated cycles of movement of the piston in the first direction (and the corresponding flow of lubricating agent along the bi-directional flow path) followed by movement of the piston in the second direction (and the corresponding flow of lubricating agent along the bi-directional flow path). Thus, the method may comprise reciprocal movement of the piston along the reservoir as described above.

The method may comprise extending and retracting the landing gear, wherein one of said extension or retraction causes a stepwise movement of the piston. It may be that the same one of said of extension or retraction causes movement of the piston in both the first and second directions. Extension and/or retraction of the landing gear may be converted to movement of the piston via a drive train as described above.

The method may comprise a step of replacing the lubricating agent within the joint after a predetermined period, for example a period of time and/or number of cycles of movement of the piston in the first and second directions along the reservoir. The method may comprise the step of replacing the lubricating agent in response to an indication provided by an indication system as described above. The step of replacing the lubricating agent may comprise replacing a first pin insert with a second pin insert by removing the first pin insert from the pin joint and inserting the second pin insert into the pin joint.

In a further aspect of the invention there is provided a method of lubricating a pin joint of an aircraft landing gear using a pin assembly comprising a reservoir, optionally a reservoir located, for example formed or received, within the joint, containing a lubricating agent and a piston dividing the reservoir into first and second chambers. The method may comprise the piston reciprocating within the reservoir for a plurality of cycles, each cycle comprising a movement of the piston in a first direction followed by a movement of the piston in a second, opposite, direction. The method may comprise receiving an indication that a predetermined number of cycles has been completed, for example from an indicator system of the pin assembly as described above. The method may comprise replacing lubricant within the pin joint in response to the indication so received. For example the method may comprise replenishing the lubricant in the joint, for example by refilling the reservoir and/or replacing a pin insert in response to the indication so received. The method may comprise periodically inspecting the landing gear, for example after a predetermined number of flights, to identify whether such an indication has been provided.

In a further aspect of the invention there is provided a method of servicing a pin joint of a landing gear using first and second pin inserts. It may be that each pin insert comprises a cartridge containing a reservoir of lubricating agent and at least one aperture in the cartridge via which lubricating agent can exit the reservoir. The method may comprise replacing a first pin insert with a second pin insert by removing the first pin insert from the pin joint and inserting the second pin insert into the pin joint.

The first and second pin inserts may be pin inserts and/or form part of a pin assembly as described above for any other aspect. The method may provide for improved reliability of maintenance by removing the need for maintenance operatives to identify all grease nipples when supplying grease to a joint. Additionally or alternatively, the method may reduce the time required to replenish the lubricating agent in a pin joint as a maintenance operative simply swaps one cartridge for another, rather than spending time using a grease gun to inject grease into the joint.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
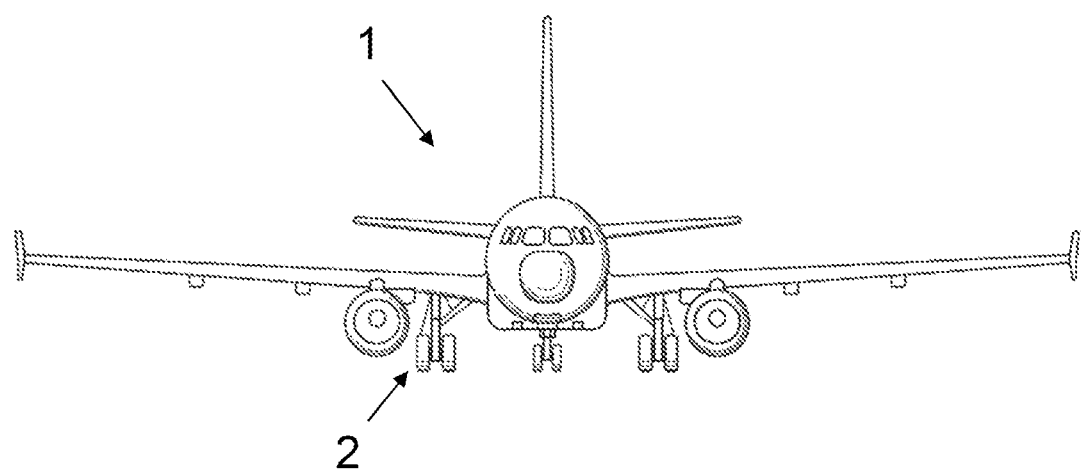
FIG. 1 shows a perspective view of an aircraft including landing gear according to embodiments of the invention.

FIG. 1 shows an aircraft 1 including main landing gear 2 according to embodiments of the invention. In the same or further embodiments the invention may find application in nose landing gear.

Figure 2:
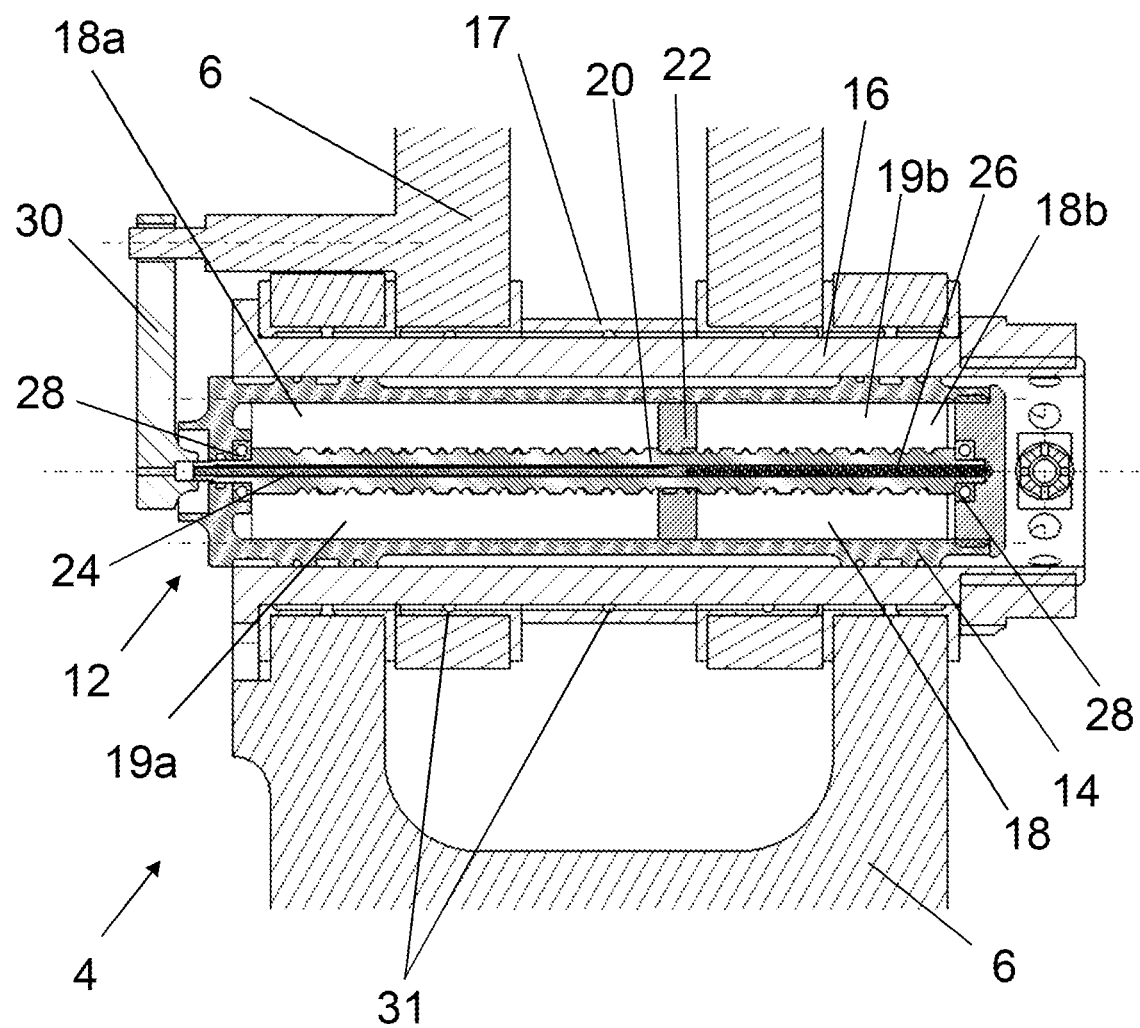
FIG. 2 shows a cross-sectional view of a pin joint according to embodiments of the invention.
Figure 3:
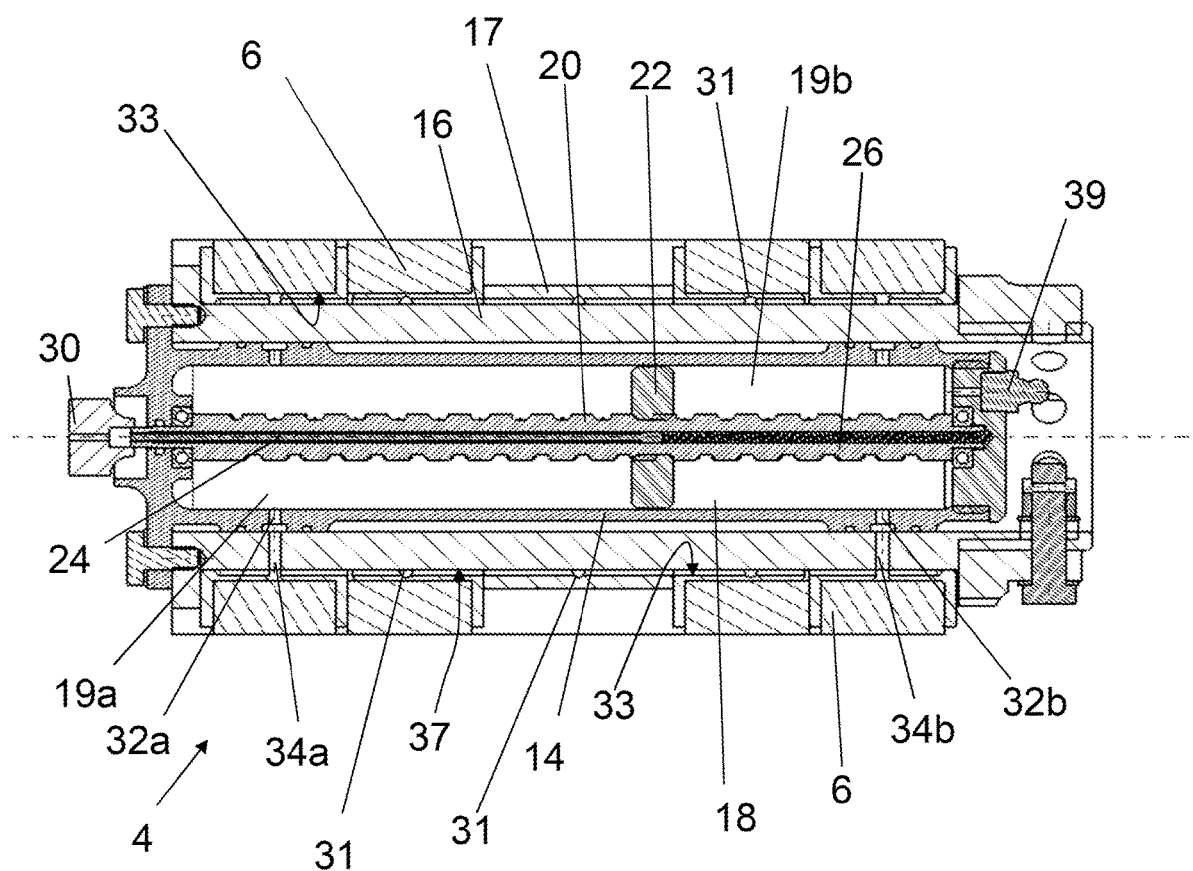
FIG. 3 shows a cross-section view of the pin joint of FIG. 2 though a different plane.

FIG. 2 shows a cross-sectional view through a pin joint 4 between two components 6 of main landing gear 2. Examples of such pin joints 4 may be found in the torque link assembly, drag stay assemblies, side stay assemblies, link assemblies and/or main fitting of a landing gear. In some embodiments pin joints as described herein may be found in the nose landing gear. The structure of each component 6 defines a cylindrical bore in which a lubrication device 12 in accordance with an embodiment of the invention is received. The lubrication device 12 comprises a main body 14 which is concentrically received within a hollow pin 16 itself concentrically received in a bushing 17 which is concentrically received in the cylindrical bore. It will be appreciated that in some embodiments bushing 17 is composed of several smaller bushes. The main body 14 is, generally speaking, in the form of a closed-ended cylinder and comprises a reservoir 18 which extends along the majority of the length of the main body 14. In other embodiments the shape of the main body and/or reservoir may differ from that shown here. In use, the reservoir 18 contains lubricating fluid, for example grease. A shaft 20 extends along the length of and is concentric to both the main body 14 and reservoir 18. A piston 22 is mounted on the shaft 20 and divides the reservoir 18 into two chambers 19a and 19b, one on either side of the piston 22. The shaft 20 is hollow. A ident arm 24, which is brightly coloured, is received within and extends from one end (the left hand end in FIG. 2)) of the shaft 20 inwards along the shaft 20. An ident spring 26 is also received within the shaft 20 and extends between the ident arm 24 and the other end (the right hand end in FIG. 2) of the shaft 20. The shaft 20 is mounted on bearings 28 for rotation relative to the main body 14. A ratchet assembly including a drive arm 30 is attached to the (left-hand) end of the shaft 20. The drive arm 30 is also attached to one of the components 6. It will be appreciated that not all elements of the ratchet assembly are shown in FIG. 3, such mechanisms being well known.

Figure 10:
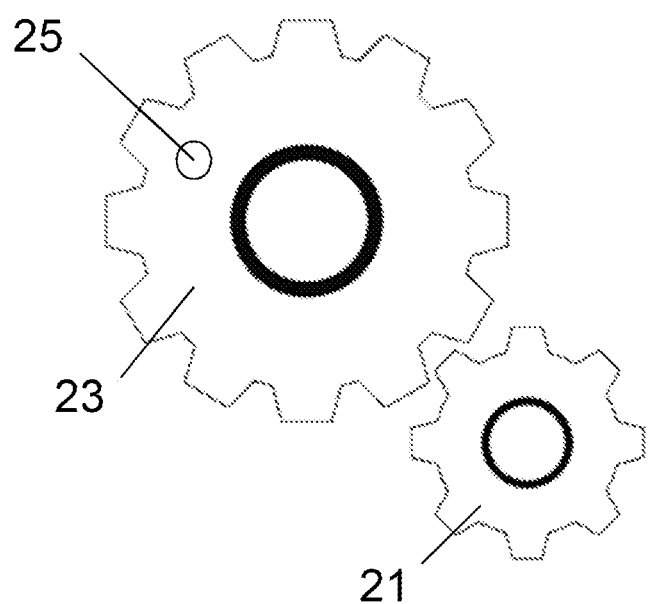
FIG. 10 shows a schematic view of elements of the drive train of a pin assembly in accordance with embodiments of the invention.

In some embodiments (see FIG. 10) the ratchet mechanism includes a smaller diameter gear 21 that meshes with a larger diameter gear 23 to drive the larger diameter gear 23 at a given ratio. The larger diameter gear 23 may have a cut out 25 sized and configured to allow the indent arm 24 to pass through. A plurality of grooves 31 are formed in an inner surface 33 of the bushing 17. As shown more clearly in FIG. 3 (a cross-sectional view in a different plane through the pin joint 4) a first set of apertures 32a are formed in the main body 14 in the region of a first end 18a (the left hand end in FIG. 2 and FIG. 3) of the reservoir 18. A second set of apertures 32b are formed in the main body 14 in the region of a second end 18b of the reservoir 18. The first and second set of apertures 32a, 32b align with a first and second set of pin-apertures 34a, 34b respectively, the pin apertures being formed in hollow pin 16 respectively. A bi-directional flow path extends between the first and second chambers 19a, 19b via the first set of apertures 32a via, the first set of pin-apertures 34a, the grooves 31 and inner surface 33 of the bushing 17 and an outer surface 37 of the hollow pin 16, the second set of pin-apertures 34b and the second set of apertures 32b. It will be appreciated that the position of the apertures 32 and pin-apertures 34 may vary. In the same or yet further embodiments the main body may include more apertures 32 and/or pin-apertures 34 thereby providing additional bi-directional flow paths between the first and second chambers 19a, 19b. It will also be appreciated that it is not necessary for the first and second set of apertures 32a, 32b to line up with the first and second set of pin-apertures 34a, 34b, provided that the relevant apertures are in fluid communication, for example via a flow channel. Optionally, a grease nipple 39 is provided on main body 14 via which a supply of lubricant can be provided to reservoir 18. In other embodiments such a grease nipple is absent.

Figure 6:
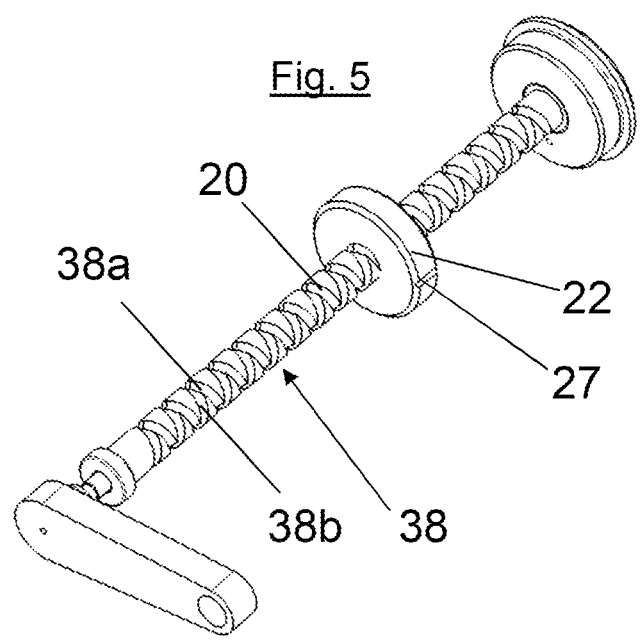
FIG. 6 shows elements of the drive train of the pin joint of FIG. 2.

As shown more clearly in FIG. 6, a self-reversing thread 38 is formed along shaft 20. The self-reversing thread 38 comprises a first helix 38a and a second helix 38b, the first and second helices 38a, 38b having opposite directions and being joined smoothly to each other at either end of the shaft 20. The outer circumference of piston 22 includes a recess 23. Recess 23 extends parallel to the longitudinal axis of the shaft 20, along the length of the piston 20. In use, recess 23 receives a protrusion (not shown) that extends lengthwise along the interior of the reservoir 18.

In use, a lubricating agent, for example grease fills reservoir 18. Movement of components 6 during extension and/or retraction of the landing gear 1 causes rotation of the drive arm 30. For one of extension or retraction, that rotation of the drive arm 30 is transmitted via the ratchet mechanism to the shaft 20 thereby causing the shaft 20 to rotate. That rotation of the shaft 20 is transformed into a translation of the piston 22 along the shaft 20 by the self-reversing thread 38. The presence of the protrusion in the recess 23 prevents rotation of the piston 22 with the shaft 20, thereby causing piston 22 to move along shaft 20 when shaft 20 rotates. For the other of extension or retraction, the ratchet mechanism does not transmit the motion to the shaft 20, thereby allowing the piston 22 to move along the main body 14 in incremental steps. As the piston 22 moves along the length of the reservoir 18 towards the right hand side of FIG. 2, lubricating agent is forced out of the second chamber 19b via the second set of apertures 32b. With each step of the piston 22 along the shaft 20, i.e. with each extension/retraction cycle of the landing gear 1, another portion of lubricating agent is forced out of the second set of apertures 32b. Lubricant thereby flows from second chamber 19b through apertures 32b and pin-apertures 34b to grooves 31 and from grooves 31 to the inner surface 33 of the bushing 17 and the outer surface 37 of the hollow pin 16. Lubricant is distributed around the inner surface 33 of the bushing 17 and the outer surface 37 of the hollow pin 16 by the grooves 31 thereby providing an even distribution of lubricant around the joint 4. After passing over the inner surface 33 of the bushing 17 and the outer surface 37 of the hollow pin 16 lubricant flows to the first chamber 19a via the grooves 31, the first set of pin-apertures 34a and the first set of apertures 32a. Thus, lubricant circulates from one side of the piston 22 to the other via the surfaces to be lubricated. When the piston 22 reaches the end of the self-reversing thread 38 the direction of motion of the piston 22 resulting from rotation of the shaft 20 is reversed. Thus, continuing rotation of the shaft 20 in the same direction causes the piston 22 to travel back along the shaft 20 in the opposite direction. It will be appreciated that in other embodiments different mechanisms may be used to move the piston back and forth along the reservoir. In the same or yet other embodiments, different arrangements may be used to prevent rotation of the piston with the shaft.

As the piston 22 moves along the length of the reservoir 18 towards the left hand side of FIG. 3, lubricating agent is forced out of the first chamber 19a via the first set of apertures 32a. With each step of the piston 22 along the shaft 20, another portion of lubricating agent is forced out of the first set of apertures 32a thereby causing a flow of lubricant along the flow path including the inner surface 33 of the bushing 17 and the outer surface 37 of the hollow pin 16 in the opposite direction such that lubricant is returned to the second chamber 19b via the second set of pin-apertures 34b and the second set of apertures 32b. The constant motion of lubricant through the joint and the recirculation of grease from one side of the piston 22 to the other reduces the likelihood of the lubricant hardening and ensures better distribution of grease over critical areas of the joint. Additionally or alternatively, this recirculation of lubricant may prolong the useful lifetime of the lubricant thereby increasing maintenance intervals.

In some embodiments, after a predetermined number of extension/retraction cycles of the landing gear 1 the cut-out 25 in the larger diameter gear 23 moves into alignment with indent arm 24 which is forced through the cut out 25 by indent spring 26 to project beyond the left-hand end of the lubrication device 12. Thus, lubrication devices in accordance with the present embodiment may provide a clear visual indication that the lubricant has been in service for a given number of cycles and therefore requires replacement. The indent spring 26 and indent arm 24 may also be configured such that failure of the drive shaft 20 causes the indent arm 24 to be ejected, for example by biasing the larger diameter gear 23 to the position in which the cut out 25 is in alignment with indent arm 24. Thus, lubrication devices in accordance with the present embodiment may provide a clear visual indication that lubricant is no longer being supplied to the pin joint 4.

While not discussed above it will be appreciated that the assembly will include numerous seals between various components to prevent leakage of grease from the pin assembly. Such seals are well known to persons skilled in the art.

Figure 4:
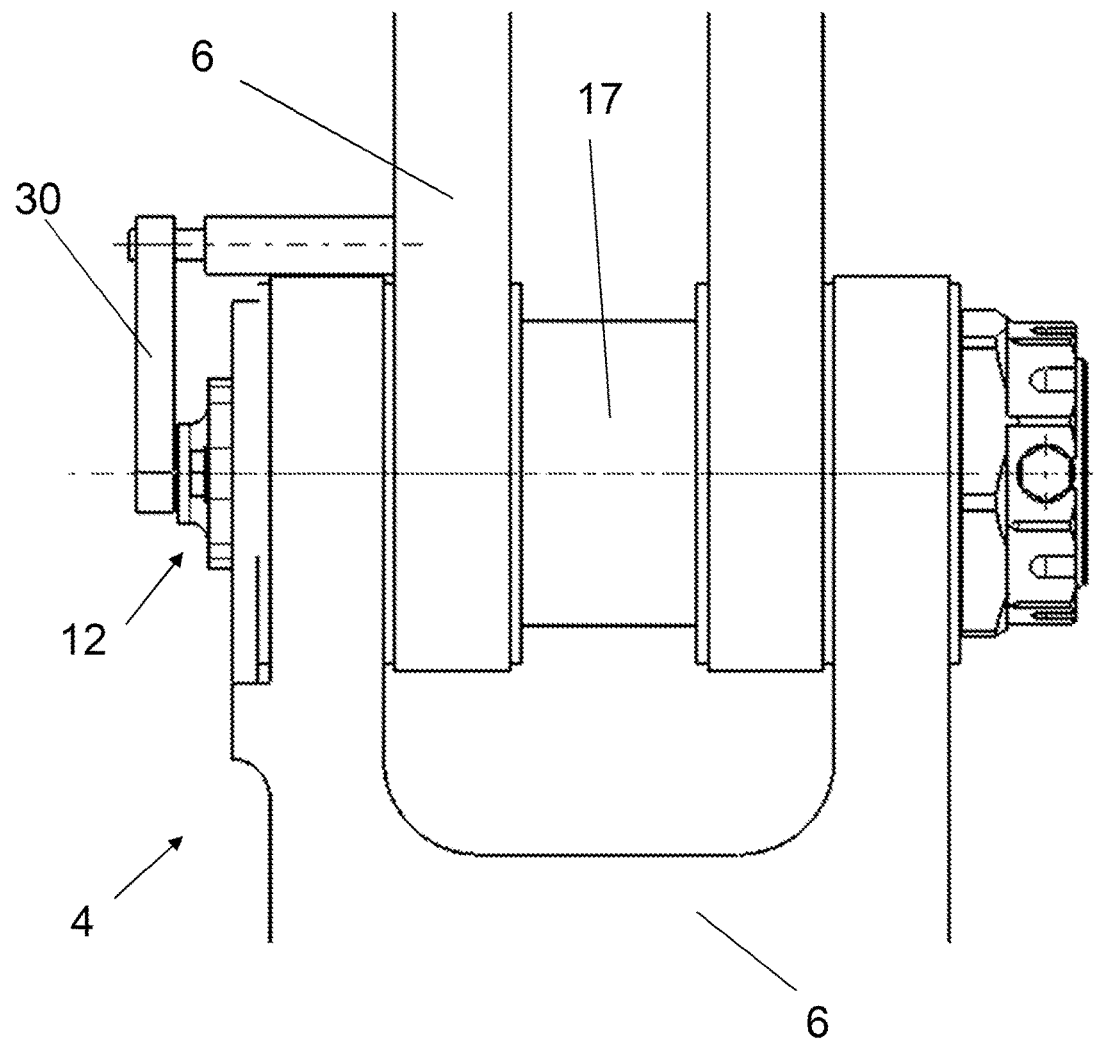
FIG. 4 shows an external view of the pin joint of FIG. 2.
Figure 5:
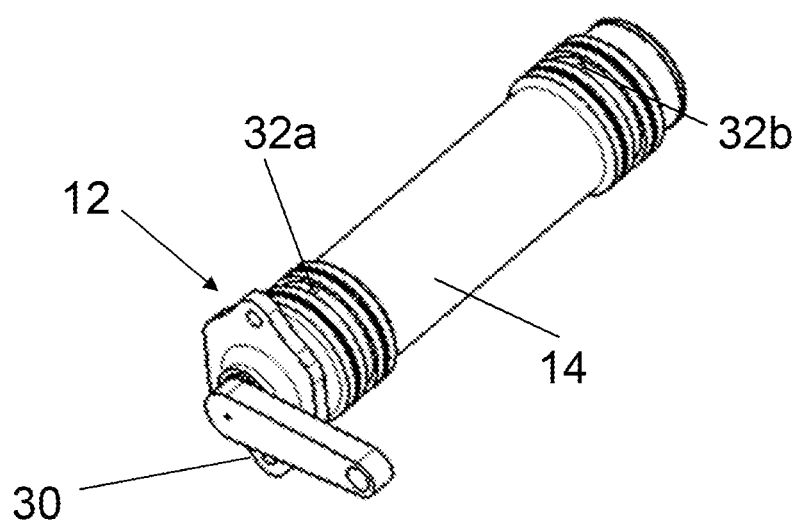
FIG. 5 shows the pin insert of the pin joint of FIG. 2.

FIG. 4 shows an external view of the pin joint 4 including the lubricating device 12. FIG. 5 shows a perspective view of the exterior of lubrication device 12. A device as shown in FIG. 5 may be considered to be in the form of a cartridge.

Figure 7:
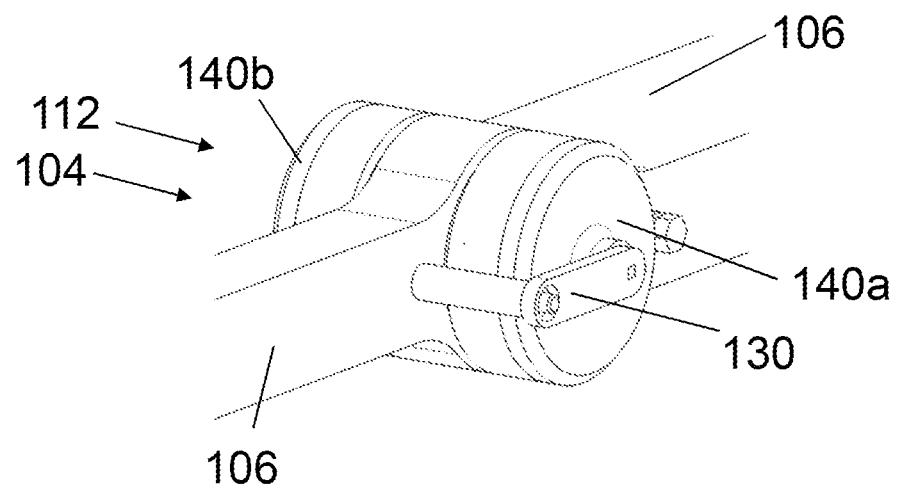
FIG. 7 shows a perspective view of a pin joint according to embodiments of the invention.

FIG. 7 shows a pin joint 104 in which a lubrication device 112 in accordance with another embodiment of the invention is received. Only those aspects of the lubrication device 112 which differ significantly with respect to the lubrication device 12 of FIGS. 2 to 6 are discussed here. The reference numerals of FIGS. 2 to 6 increased by 100 are used to denote elements that are similar as between FIGS. 2 to 6 and the present embodiment. It will be appreciated that features that are described above with reference to other embodiment may be used in the present embodiment. The lubrication device 112 operates in substantially the same manner as lubrication device 12.

The lubrication device 12 of FIGS. 2 to 6 has a main body 14 that defines the reservoir 18. In contrast, the reservoir 118 of lubrication device 112 is defined by the hollow pin 116 and two end caps 140. Hollow pin 116 is concentrically received within bushing 117 and shaft 120 and piston 122 are concentrically received within the hollow pin 116. A first end cap 140a extends over one end of the hollow pin 116, the bushing 117 and the structure of components 106 defining the joint 104 thereby sealing off one end of the joint 104. A second end cap 140b is similarly position at the other end of the joint 104. A first set of pin-apertures 134a are formed between a first end 116a of the hollow pin 116 and the first end cap 140a. A second set of pin-apertures 134b are formed between a second end 116b of the hollow pin 116 and the second end cap 140b. A flow path extends between the first set of pin-apertures 134a and the second set of pin-apertures 134b via the inner surface 133 of the bushing 117 and the outer surface 137 of the hollow pin 116. Operation of the lubrication device 112 is substantially as described above.

Figure 9:
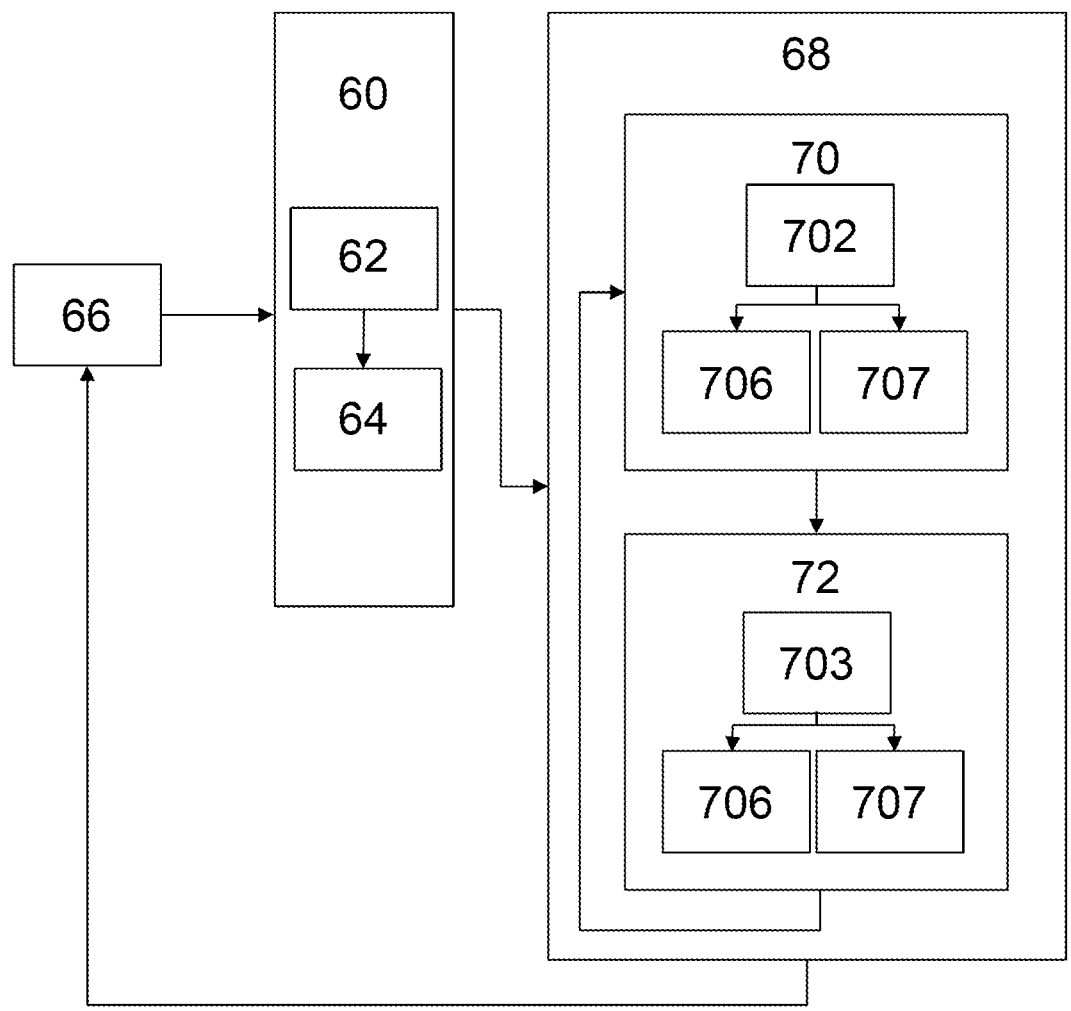
FIG. 9 shows a flow chart of an example method of lubricating a pin joint in accordance with the invention.

FIG. 9 show a flow chart of a method of servicing an aircraft, for example using a lubrication device of the type discussed above. The method comprises a step of replacing 60 the lubricant in a pin joint. The step of replacing 60 the lubricant comprises removing 62 a first lubrication device containing a store of lubricating agent from the pin joint and inserting 64 a second, different, lubrication device containing a store of lubricating agent in the pin joint. Thus, one cartridge may be swapped out for another thereby reducing the time and cost of maintenance operations in comparison with prior art methods that require grease to be supplied to a lubrication device in situ at relatively short intervals.

Optionally, the step of replacing 60 the lubricant may be carried out in response to a visual indication provided 66 by the lubrication devices, for example using an indent arm or indication system as described above. In other embodiments the step of replacing 60 the lubricant may be carried out after a predetermined interval, for example a predetermined period of time or number of flights.

Optionally, the method may comprise a step of providing 68 lubricating agent to the pin joint. The step of providing 68 lubricant agent may comprise lubricant flowing in a first direction 70 along a flow path between first and second chambers of a lubrication device, the flow path also including a surface of the joint that is to be lubricated. The step of providing 68 lubricant agent may comprise lubricant flowing in a second, opposite, direction 72 along the same flow path between first and second chambers of a lubrication device, the flow path also including a surface of the joint that is to be lubricated. The step of lubricant flowing along the flow path in the first direction 70 may include stepwise movement 702 of a piston along a reservoir in a first direction. The step of lubricant flowing along the flow path in the second direction 72 may stepwise movement 703 of a piston along a reservoir 18 in a second direction. Each stepwise movement in the first direction 702 or the second direction 703 causes a portion of lubricating agent to be forced out 706 of a chamber of the device, and another portion of lubricating agent to return 707 to the other chamber of the device, the direction of flow depending on the direction of movement of the piston. A cycle of lubricant flowing in a first direction 70 and then lubricant flowing in a second direction 72 may be carried out a plurality of times before the lubricant is replaced 60.

In some embodiments, the stepwise movement 702 of a piston along a reservoir in a first direction may be caused by one of extension or retraction of the landing gear, said extension or retraction causing rotation of a shaft on which the piston is mounted, for example on a self-reversing thread. The stepwise movement 703 of a piston along a reservoir in a second direction may also be caused by the same one of extension or retraction of the landing gear, said extension or retraction causing rotation of a shaft on which the piston is mounted, for example on a self-reversing thread. The stepwise movement is in the first direction until the piston reaches an endpoint, for example the end of the self-reversing thread, and then in a second direction until the piston reaches another endpoint, for example the other end of the self-reversing thread 38, the movement then being in the first direction once again. This cycle of stepwise movement repeats to provide reciprocal motion of the piston within the reservoir.

The step of providing 68 lubricating agent to the pin joint may be carried out a plurality of times before the step of replacing 60 the lubricant. The step of providing 68 lubricating agent to the pin joint may be carried out a plurality of times after the step of replacing 60 the lubricant. The step of providing a visual indication 66 may be carried when the step of providing 68 lubricating agent to the pin joint has been carried out a predetermined number of times.

Figure 8:
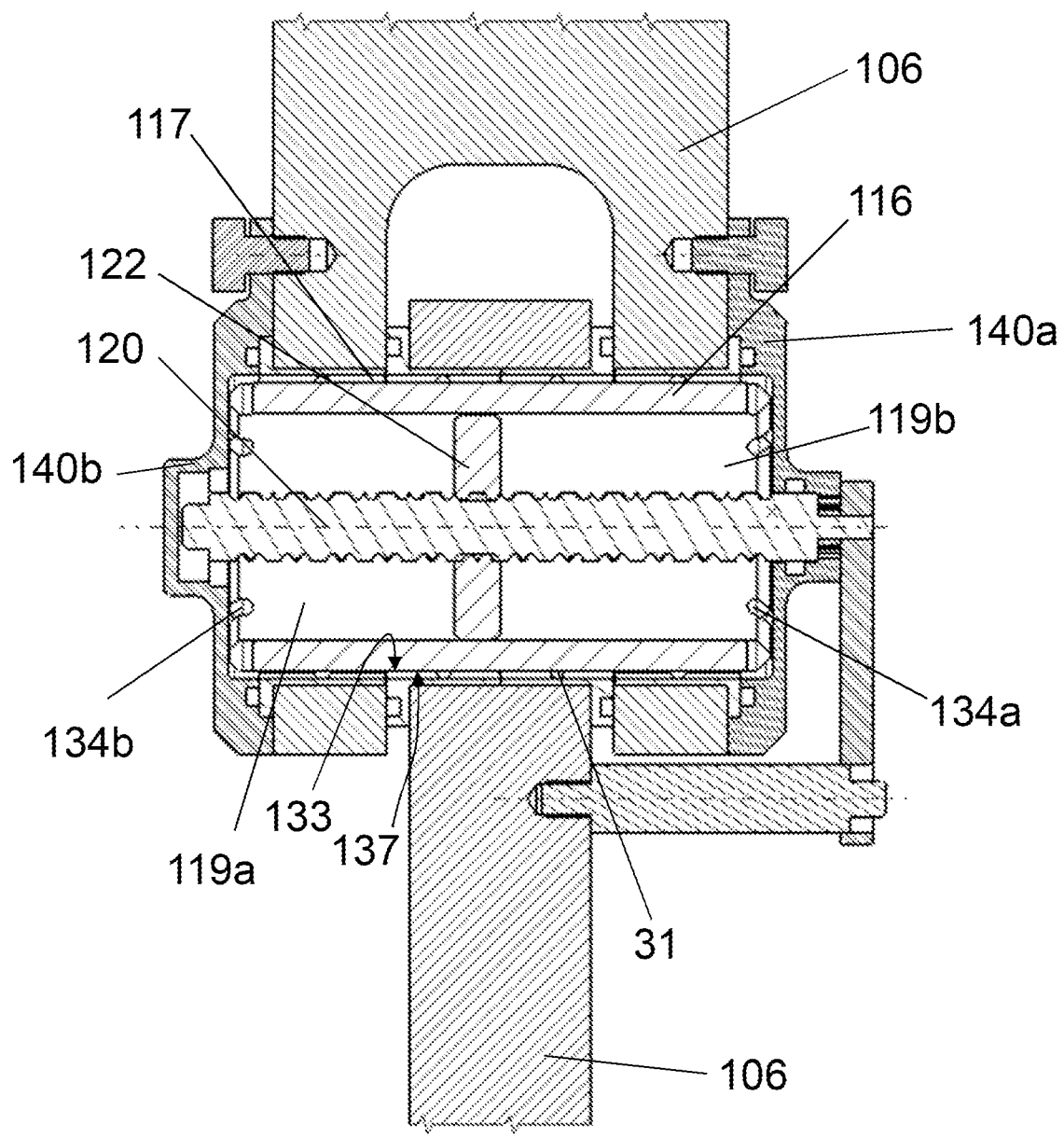
FIG. 8 shows a cross-section view of the pin joint of FIG. 7.

In a variation on the method described above, when a lubrication device of the type show in FIGS. 7 and 8 is used the method may comprise using removing an end cap 140, shaft 120 and piston 112 from within hollow pin 116, removing lubricant from within reservoir 118, refilling reservoir 118 with fresh lubricant and replacing cap 140, shaft 120 and piston 112. Alternatively, a grease nipple may be used to replenish the supply of grease in the lubrication device.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A pin assembly for use in a pin joint of an aircraft landing gear, the pin assembly, comprising:
   structure defining a reservoir for storing a lubricating agent, said structure being configured for insertion into the pin joint,
   a piston mounted for reciprocal movement within the reservoir, the piston dividing the reservoir into a first chamber and a second chamber;
   a first bi-directional flow path configured to permit flow of the lubricating agent in a first direction between the first chamber and the exterior of the pin assembly and a second direction opposite the first direction, and
   a second bi-directional flow path configured to permit the flow of the lubricating agent in a first direction between the second chamber and the exterior of the pin assembly and a second direction opposite the first direction.

2. A pin assembly according to claim 1, wherein the pin assembly comprises a hollow pin configured to be received in the pin joint.

3. A pin assembly according to claim 2, wherein the structure defining the reservoir comprises the hollow pin and one or more end caps that close off the hollow pin.

4. A pin assembly according to claim 1, wherein the pin assembly comprises a cartridge configured to be received in the hollow pin, the cartridge comprising the structure defining the reservoir.

5. A pin assembly according to claim 1, wherein the piston is mounted on a shaft for reciprocal movement along the reservoir, and the shaft comprises a self-reversing thread such that said reciprocal movement of the piston is provided by rotation of the shaft in a first rotational direction.

6. A pin assembly according to claim 5, wherein the pin assembly comprises a drive train for connection to the landing gear such that extension or retraction of the landing gear causes rotation of the shaft in the first rotational direction.

7. A pin assembly according to claim 6, wherein the drive train comprises a ratchet mechanism such that one of rotation and extension of the landing gear causes rotation of the shaft in the first rotational direction and the other of rotation and extension of the landing gear does not cause rotation of the shaft.

8. A pin assembly according to claim 6, wherein the drive train is configured such that one of rotation and extension of the landing gear causes a stepwise movement of the piston along the length of the reservoir, said reciprocal movement comprising a plurality of such stepwise movements.

9. A pin assembly according to claim 1, wherein the structure defining the reservoir comprises; a first aperture which defines, at least in part, the first bi-directional flow path; and a second aperture which defines, at least in part, the second bi-directional flow path.

10. An aircraft landing gear having a pin joint comprising:
    a surface to be lubricated; and
    a pin assembly in accordance with claim 1, and
    wherein the pin joint is configured such that the first bi-directional flow path is connected to the second bi-directional flow path via the surface to be lubricated.

11. An aircraft landing gear according to claim 10, the pin joint further comprising a bushing in which the pin assembly is received, and wherein an outer surface of the pin assembly and/or an inner surface of the bushing comprises a plurality of grooves, and wherein the pin joint is configured such that the first bi-directional flow path is connected to the second bi-directional flow path via the surface to be lubricated and at least one of the plurality of grooves.

12. A method of lubricating a pin joint of an aircraft landing gear using a pin assembly comprising a reservoir containing a lubricating agent and a piston dividing the reservoir into first and second chambers, the method comprising:
    the piston reciprocating within the reservoir, said reciprocation comprising movement in a first direction and movement in a second, opposite, direction; and
    movement of the piston in the first direction causes lubricating agent to flow in a first flow direction along a bi-directional flow path connecting the first chamber to the second chamber via a surface to be lubricated; and
    movement of the piston in the second direction causes lubricating agent to flow in a second, opposite, flow direction along the bi-directional flow path.

13. A pin assembly for use in a pin joint of an aircraft landing gear, the pin insert comprising
    structure defining a reservoir for storing a lubricating agent, said structure being configured for insertion into the pin joint,
    a piston mounted for reciprocal movement within the reservoir, said reciprocal movement comprising a plurality of cycles, each cycle comprising a movement of the piston in a first direction followed by a movement of the piston in a second, opposite, direction;
    wherein the reservoir is configured to allow the flow of the lubricating agent in a first direction and second direction opposite the first direction,
    an indicator system configured to provide an indication that the piston has completed a predetermined number of cycles.

14. A pin assembly according to claim 13, wherein the indicator system is configured to provide a visual indication.

15. A pin assembly according to claim 13, wherein the indicator system comprises an indent arm and a resilient member configured to move the indent arm to a 'maintenance due' position when the piston has completed a predetermined number of cycles.

* * * * *